United States Patent [19]
Holzer et al.

[11] Patent Number: 5,148,178
[45] Date of Patent: Sep. 15, 1992

[54] PRECISION RANGING SYSTEM

[75] Inventors: William C. Holzer; Arthur H. Hardy, Jr., both of Santa Barbara, Calif.

[73] Assignee: Santa Barbara Research Center, Goleta, Calif.

[21] Appl. No.: 255,308

[22] Filed: Oct. 11, 1988

[51] Int. Cl.⁵ .............................................. G01S 9/06
[52] U.S. Cl. .................................... 342/127; 342/118
[58] Field of Search ................. 342/82, 118, 127, 124, 342/134

[56] References Cited

U.S. PATENT DOCUMENTS

| | | |
|---|---|---|
| 2,422,074 | 6/1947 | Bond . |
| 2,710,959 | 6/1955 | Pierce . |
| 2,979,715 | 4/1961 | Hammond, Jr. . |
| 3,165,739 | 1/1965 | Long et al. . |
| 3,191,171 | 6/1965 | Zuefeldt et al. . |
| 3,830,567 | 8/1974 | Riegl . |

Primary Examiner—Thomas H. Tarcza
Assistant Examiner—Mark Hellner
Attorney, Agent, or Firm—W. C. Schubert; W. K. Denson-Low

[57] ABSTRACT

The range (R) to a target (12) is precisely determined by controlling the amplitude of the carrier before modulation using a feedback signal derived from the detected return. The amplitude of the carrier is adjusted (40) so that all return pulses have a constant amplitude. Hence, for any given range, all return pulses cross threshold at the same time, thereby eliminating ranging errors due to phase distortion. The return pulses are threshold detected (54) and converted to a CW signal, which is then down converted. The phase information, which is indicative of target range, is preserved in the down conversion process and is extracted by phase comparison (72) with a reference signal to determine the target range.

21 Claims, 2 Drawing Sheets

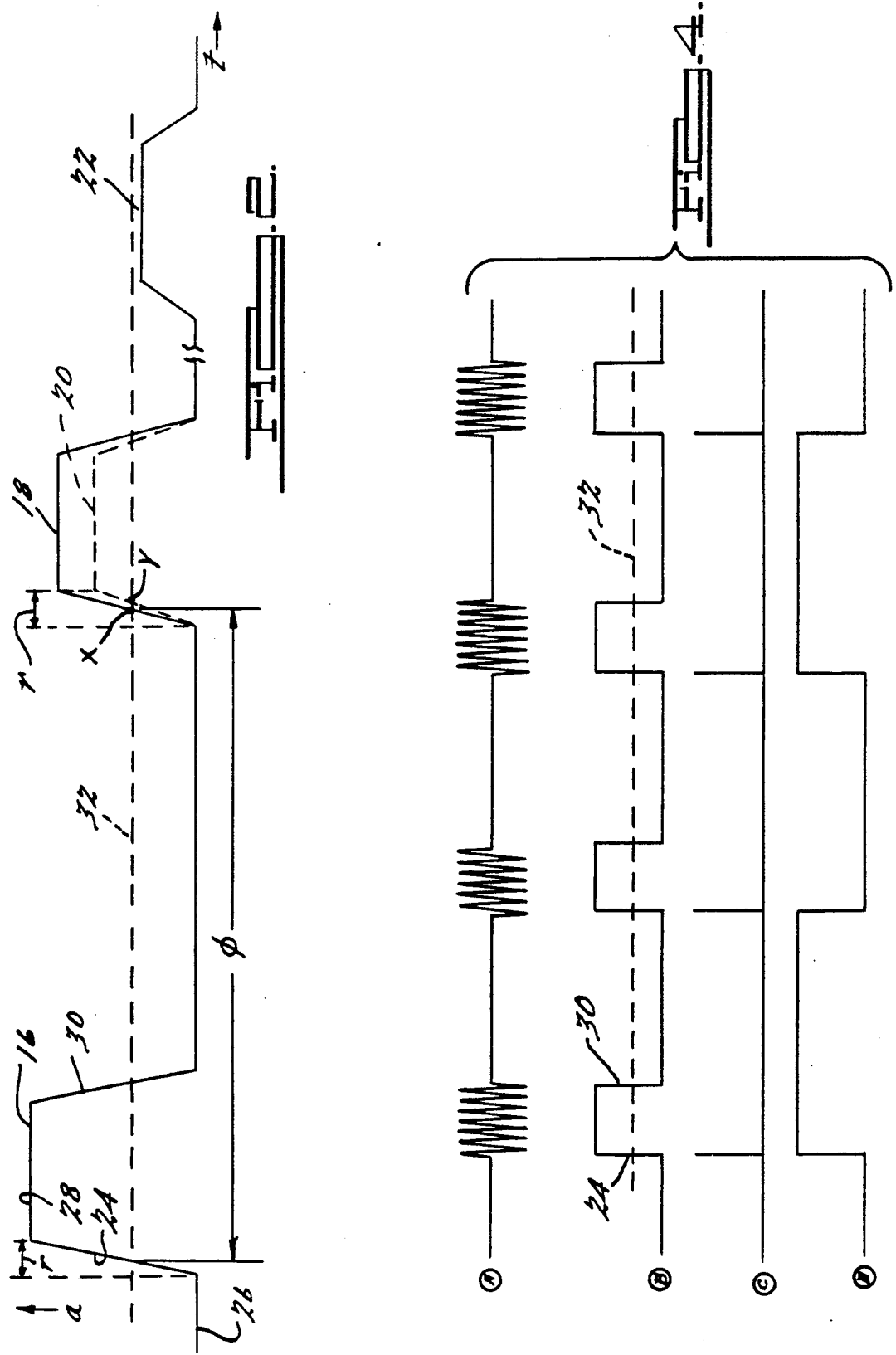

PRECISION RANGING SYSTEM

BACKGROUND OF THE INVENTION

The present invention relates generally to reflected signal ranging systems and, more particularly, to an electromagnetic ranging system employing a hybrid of pulsed and continuous wave techniques to achieve very high ranging accuracy.

Present day radar techniques for determining the distance or range to a target have serious shortcomings when extremely high accuracy is required. The inability to give repeatable and highly accurate results has heretofore meant that radar ranging techniques have been ruled out for whole classes of applications which could be conveniently handled using radar techniques, if the accuracy could be improved.

As an example, consider the problem of measuring water height in a river. The classical solution is to place a measuring stick in the river and periodically check it to see where the water line crosses the stick. The classical technique requires a person to periodically check the water height, making this solution infeasible for large scale geodetic surveys. If radar techniques could achieve the desired accuracy, then water height could be quite easily measured by placing a radar transceiver on a bridge or other fixed structure and by measuring the water height as a function of range between the transceiver and the water's surface. The data could then be broadcast to a nearby geodetic station for effectively continuous monitoring of the water height. Regretfully, present day radar is not accurate enough to measure distances on the order of inches or fractions of inches. Hence, radar techniques have not been available to solve the exemplary water height problem.

The present invention provides a precision ranging system using radar techniques which achieves accuracies never before achieved with conventional radar techniques. The invention employs a combination of short pulse ranging and continuous wave processing techniques to measure the range of a noncooperative target with an absolute accuracy of less than plus or minus 0.015 feet or better. According to the invention, a short pulse or burst of electromagnetic energy is transmitted and the return from the target is envelope detected. The magnitude of the return pulse is sensed and fed to a level controller in the transmitter to ensure that the return pulse maintains a constant amplitude. The return pulse is then threshold detected and converted to a square wave which is in turn down converted. The phase of the down converted signal is then measured and yields the range under measurement.

By ensuring that the amplitude of the received pulse remains constant, the invention ensures that the slope of the leading edge of each received burst is constant. Thus, by maintaining the slope constant, the threshold crossing point is held in a constant relationship relative to the transmitted pulse, yielding extremely high accuracy. During the down conversion process, the phase of the return signal is preserved while the time scale is expanded by several orders of magnitude for much greater precision. The invention is virtually immune from range errors due to returns from distributed clutter (such as rain, fog or aerosols) or from objects in the detection pattern side lobes or from multipath distortion. The invention is not limited to any specific portion of the electromagnetic spectrum and can be used with either single or dual antenna (optic) transceivers and with direct or heterodyne detection schemes.

According to the invention, a hybrid technique is employed which achieves the advantage of short pulse, leading edge detection ranging systems in avoiding the clutter and side lobe problems, and also achieves the advantages of continuous wave ranging systems which are not limited in absolute accuracy by currently achievable rise times. Accordingly, a method is provided for determining the range to a target comprising the steps of reflecting a first electromagnetic signal from the target, receiving the first signal and generating a second electromagnetic signal at an energy level determined by the strength of the first received signal. The method continues by reflecting a second signal from the target, receiving the second signal and determining a phase difference between the generated second signal and the second received signal. Finally, the range to the target is determined in accordance with the phase difference. Further, in accordance with the inventive method, the second received signal is down converted by mixing or multiplying with a reference signal of slightly different frequency to produce sum and difference signals, (the difference signal being at a much lower frequency than the carrier). The difference signal, so produced, is used in determining the phase difference.

The invention further provides an apparatus for determining the range to a target comprising a transmitter having a means for providing oscillations at a controlled amplitude and a gating means for modulating the oscillations. The invention further comprises a receiver having means for providing a control signal based on the signal strength of received signals, for controlling the amplitude of the oscillations produced by the transmitter. The receiver further comprises a threshold detecting circuit and a down converter means for providing a shifted frequency signal having a phase portion. The receiver further comprises a means for comparing the phase portion of the shifted signal with the phase portion of a reference signal and for thereby determining the range to the target.

For a more complete understanding of the invention, reference may be had to the following specification and to the accompanying drawings.

BRIEF DESCRIPTION OF THE DRAWINGS

FIG. 2 is a waveform diagram useful in illustrating the principles of the invention;

FIG. 4 is a series of diagrammatically simplified waveforms of signals occurring at various indicated points in the circuit of FIG. 3.

DETAILED DESCRIPTION OF THE PREFERRED EMBODIMENT

Figure 1:
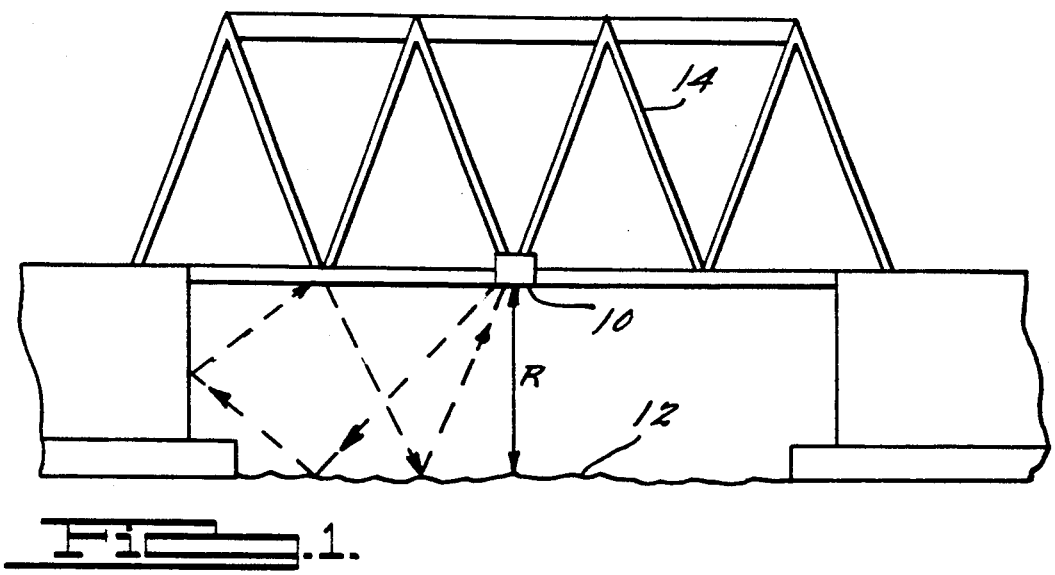
FIG. 1 is a diagrammatic view of an exemplary application of the invention.

With reference to FIG. 1, the invention is illustrated in an exemplary application of measuring the level of water in a river. The radar transceiver of the invention is indicated generally at 10, a distance or range R above the water surface 12. In the exemplary application, transceiver 10 may be mounted above the water surface on a bridge 14. The direct path between transceiver 10 and the water surface 12 is shown in solid line, while a spurious multipath signal is shown in dotted line. The multipath signal, included here to illustrate one of the problems which this invention overcomes, results from multiple reflections. In a continuous wave (CW) system, multipath signals add to the main return, causing phase distortion and ranging errors. It is often difficult to compensate for these errors in a CW system, since the multipath signal is at the same frequency as the main return. Similar range errors are caused by flase returns from objects in the detection pattern side lobes, such as the bridge embankments and by distributed clutter, such as rain, dust or fog between the transceiver and the water surface.

To overcome the problems caused by the addition of extraneous returns from nontarget objects, multipath reflections and clutter, the present invention utilizes a short pulse transmission. FIG. 2 illustrates the envelope of the short pulse transmission with the time scale exaggerated somewhat to better illustrate the rise time of the envelope. More specifically, FIG. 2 illustrates a group of pulsed signal envelopes plotted by signal strength or amplitude (a) as a function of time (t). It will be understood that the waveforms of FIG. 2 are in practice placed upon or used to modulate a carrier frequency. The invention is not limited to any specific portion of the electromagnetic spectrum and is, therefore, useable with carriers at both radio and microwave frequencies and at optical frequencies.

More specifically, FIG. 2 illustrates a transmitted pulse 16 and a series of return pulses 18, 20 and 22. Note that the return pulses 18 and 20 occur a time phi later than the transmitted pulse 16. This time phi represents the time it takes for the pulse or burst of electromagnetic energy to propagate from the transceiver, to the target, and back. Stated differently, phi is the phase difference between the transmitted and return pulses. Given the speed of propagation, the range to the target can be readily determined from this time phi. Return pulse 22 is illustrated as occuring at some time greater than the return pulses 18 and 20. Return pulse 22 may, for example, result from a multipath signal which has undergone several reflections (and, hence, greater transit time) than the main return pulses 18 and 20. Hence, return pulse 22 occurs later in time.

Although exaggerated somewhat for illustration purposes, the transmitted pulse 16 has a leading edge 24 with a positive finite slope. In practice, pulsed waveforms are generated by gating a carrier on and off. Due to physical limitations in the gating circuit, the rise time of leading edge 24 is a finite time. With presently available electronics, it is possible to gate a carrier on with a rise time of 2 nanoseconds from base 26 to peak 28 (see rise time r in FIG. 2). A similar finite fall time is seen in trailing edge 30. The rise time and fall time are, thus, determined by the physical limitations of the electronic gating circuitry. The actual duration of the overall pulse is determined by the length of time the gate remains open. Hence, it will be understood that the shape of the waveforms illustrated in FIG. 2 are merely exemplary and for the purpose of illustrating the principles of the invention and should not be construed as limiting the scope of the claims.

The invention is well adapted for use with noncooperative targets. Generally speaking, noncooperative targets cannot be readily controlled by the radar operator. The water surface 12 is a good example of a noncooperative target inasmuch as the wave motion and river currents affect the reflective surface in often unpredictable ways which cannot be readily controlled. The wave motion and currents produce a scintillation, causing the return pulse to vary in amplitude to a considerable extent. Return pulses 18 and 20 illustrate different amplitudes as might occur due to target scintillation. In comparing the return pulses 18 and 20, it is important to recognize that the rise time r is the same for both and also the same as the rise time of transmitted pulse 16. Notably, however, the slopes of the respective leading edges of pulses 18 and 20 are not the same, since pulse 18 attains a greater amplitude than pulse 20. As another consequence of the difference in amplitudes, the leading edge of pulse 18 crosses a predetermined threshold line 32 sooner than does the leading edge of pulse 20. Pulse 18 crosses the threshold at point X, whereas pulse 20 crosses the threshold at point Y, a slight time later. By comparison, pulse 22 is significantly attenuated and does not cross threshold line 32 at all. Recall that the phase difference or time delay phi between the transmitted pulse and the received pulse is used to compute range R. The time difference between threshold crossing X and threshold crossing Y thus represents error which, if not controlled, degrades ranging accuracy.

Figure 3:
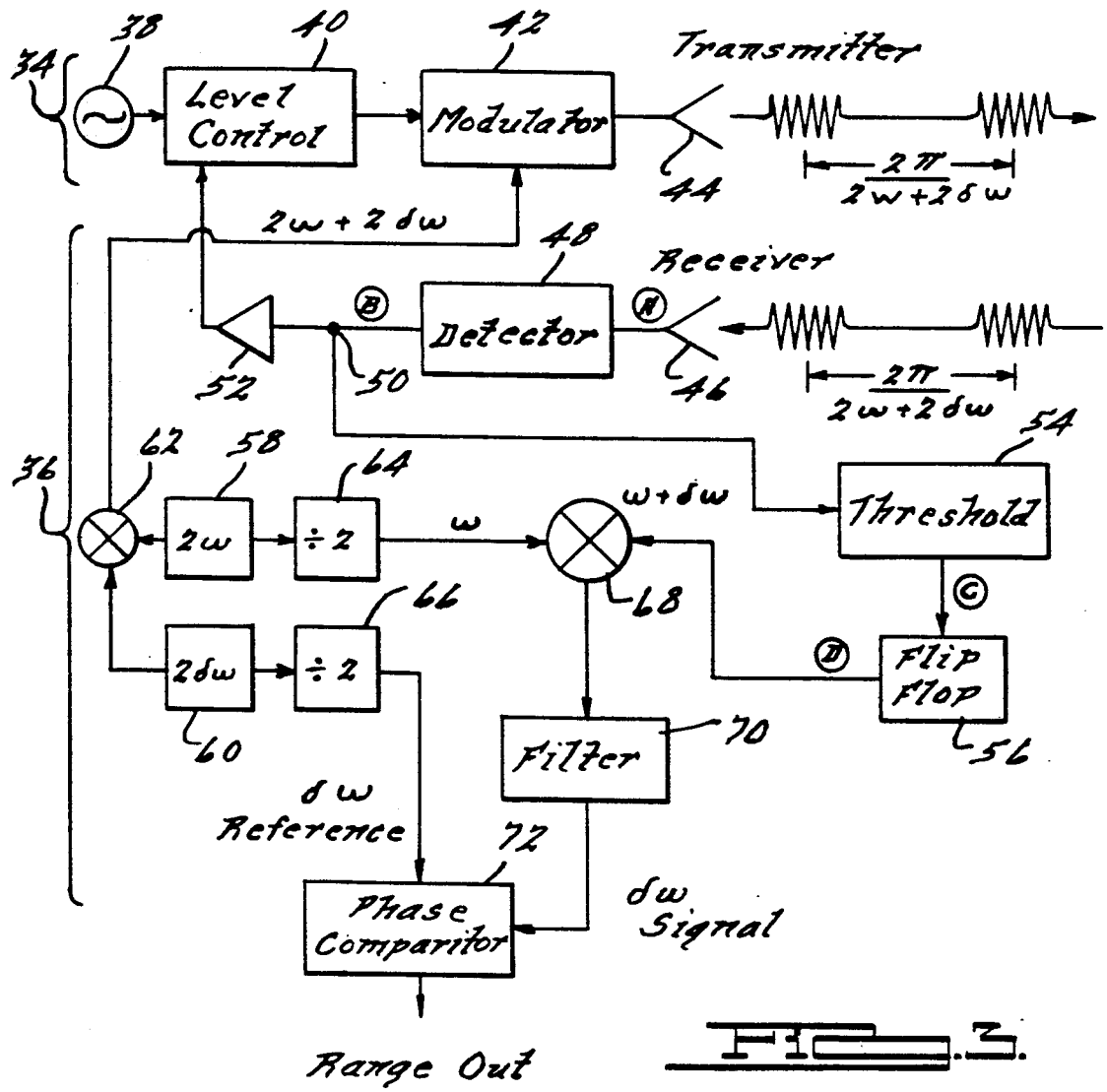
FIG. 3 is a schematic diagram of the invention.

The present invention eliminates the timing errors which result from the variance in slope of return pulse leading edges. The invention compensates for this error by automatically adjusting the level of the transmitted pulse so that the slope of the return pulse remains constant. With reference to FIG. 3, the circuit for implementing the invention is illustrated. The invention comprises a transmitter section 34 and a receiver section 36. The transmitter section comprises an oscillator 38 for generating a carrier frequency. The output of oscillator 38 is fed through a level control circuit 40 which is in turn coupled to modulator 42. Modulator 42 drives antenna 44. Although the invention may be implemented for a wide range of carrier frequencies, the invention may be practiced using a CW Gunn oscillator producing a carrier frequency at nominally 32 GHz. Level control circuit 40 may be implemented as a variable attenuator consisting of 2 PIN switches in series. Modulator 42 may also be implemented using a third PIN switch and driven with a modulation of 2 w+2 dw. A representative output waveform is illustrated to the immediate right of antenna 44. The illustrated waveform comprises gated carrier oscillations at a repetition frequency of 2 w+2 dw. Stated differently, the period between pulses is 2 pi/(2 w+2 dw). Modulator 42 forms the leading and trailing edges of the pulse train with the rise time of the leading edge and fall time of the trailing edge determined by the electrical characteristics of the modulator circuit.

The receiver 36 comprises antenna 46 coupled to detector circuit 48. Detector circuit 48 may employ either direct or heterodyne detection schemes; the invention is practical with both. Generally to the right of antenna 46 is a waveform depicting the reflected or received signal exemplary of the signal at point A on the circuit diagram of FIG. 3. The waveform at point A is also shown in FIG. 4, line A. As indicated in FIG. 3, the reflected signal is of essentially the same character as the transmitted signal and has the same repetition frequency. Although not explicity illustrated in FIG. 3, the amplitude of the pulses or bursts of energy at the receiver antenna 46 would normally be somewhat lower than of the amplitude of the transmitted signal. This is due to the energy loss in transmission through the medium and reflection from the target.

The output of detector 48 is illustrated diagrammatically at line B in FIG. 4. In this case, the leading edge 24 and trailing edge 30 of each pulse is illustrated by vertical lines. It will be understood, however, that the rise and fall times are finite and, hence, the leading end trailing edges have a slight slope which is imperceptable in FIG. 4. The output of detector 48 is split at junction 50, with the output from the junction being fed through amplifier 52 to level control circuit 40 and also fed to threshold detector circuit 54. The signal fed through amplifier 52 controls the attenuation or gain of level control circuit 40 in accordance with the strength of the reflected signal which is received by antenna 46. The signal from amplifier 52 thus provides closed loop feedback control of the amplitude of the transmitter carrier, before the carrier is modulated. Preferably, the amplitude of the transmitted carrier is adjusted so that the received signal is on the order of twice the amplitude of the threshold provided by threshold detector 54. For reference purposes, the threshold level is indicated by threshold line 32 in FIG. 4, line B.

Threshold detector 54 produces an output spike or pulse each time the leading edge 24 of the detected waveform crosses the threshold 32. Line C of FIG. 4 illustrates the output of threshold detector 54. This output signal is fed to a flip flop circuit 56 which produces a square wave output, changing state with each spike or pulse from the threshold detector 54. This square wave is shown in line D of FIG. 4 and will be seen to comprise a frequency one-half of the repetition frequency of the transmitted waveform. In other words, the square wave output of flip flop 56 has a frequency of w+dw. Note that the modulation signal applied to modulator 42 has a frequency of 2 w+2 dw.

As will be explained momentarily, the invention utilizes a down-conversion technique for measuring the phase (transit time) of the received pulse which is in turn used to compute the target range. In order to effect down-conversion, the signal from the flip flop 56 is mixed or multiplied with a reference signal whose frequency is slightly offset from or detuned with respect to the frequency of the flip flop output. This mixing or multiplication produces sum and difference frequencies. If the difference or detuning between the flip flop output signal and the reference signal is sufficiently small, then the difference frequency can be made quite low. This is an advantage, since at any given phase angle difference, lower frequencies produce longer and, hence, more easily measured delay times. This phenomenon is discussed more fully below.

In order to produce the necessary reference signal, at a frequency slightly detuned relative to the modulation repetition frequency, frequency synthesizers 58 and 60 are provided. Frequency synthesizer 58 produces a signal of a predetermined frequency of 2 w. Frequency synthesizer 60 produces a signal at a second predetermined frequency of 2 dw. The outputs of synthesizers 58 and 60 are combined in multiplier 62 to produce a sum component 2 w+2 dw, which is fed to modulator 42 to provide the modulation signal. The outputs of frequency synthesizers 58 and 60 are also fed to a pair of divide by 2 circuits 64 and 66, respectively, which in turn provide signals at frequencies of w and dw, respectively. The w reference signal is multiplied with the output from flip flop 56 in multiplier 68 to produce sum and difference frequencies at the output thereof. This output is then filtered in filter 70 to extract the difference component, i.e., the dw portion of the output from flip flop 56. Note that the dw portion of the flip flop output is derived from the reflected signal received in antenna 46. Thus, the dw component contains phase information indicative of the range to and from the target. The dw reference signal from divide by 2 circuit 66 comes directly from the frequency synthesizer and is used as a reference standard against which the dw signal from filter 70 is compared in phase comparator 72. The output of phase comparator 72 is a signal representing the phase difference between dw reference standard and dw received signal. This phase difference yields the range to the target.

The illustrated circuit of FIG. 3 is set up so that the w signal is applied from divide by 2 circuit to multiplier 68, and the w+dw signal is applied to multiplier 68 from flip flop 56. The invention may also be implemented whereby the frequency synthesizers provide a reference of w+dw to multiplier 68 and whereby the transmitted signal is modulated at 2 w so that the flip flop output produces a signal at a frequency w. In either case, multiplier 68 is fed with signals from which the phase difference dw may be extracted.

To demonstrate the operation of the invention, it will be assumed that oscillator 38 is producing a carrier frequency at 32 GHz. It will further be assumed that the carrier is being modulated or gated on and off by modulator 42 to produce a train of repetitive pulses, each pulse having a duration of 5 ns. It will further be assumed that the modulation repetition rate is 6.006 MHz., i.e., the individual gated pulses or bursts of energy occur approximately 166.5 ns apart. Referring to FIG. 3, the modulator 42 is supplied a modulating signal of 2 w+2 dw, which is a representation of the modulation signal in radian frequency (i.e., radians per second). To convert from radian frequency in radians per second to frequency in cycles per second or Hertz, recall that 1 cycle per second (Hertz) is equal to 2 pi radians per second. Thus, in the present example where the modulation repetition frequency is 6.006 MHz., w is 6 pi radians per second and dw is 0.006 pi radians per second. For convenience, frequency will be stated in Hz. throughout the remainder of this example.

The gated signal is transmitted via antenna 44 into free space, where it propagates at the speed of light toward the target (in this case water surface 12). The transmitted signal reflects from the water surface to provide a return signal which is picked up by receiver antenna 46. For purposes of understanding the invention, it will be assumed that any wave motion at water surface 12 is several orders of magnitude slower than the 6.006 MHz. repetition frequency. If this is the case, then the target may be considered as effectively stationary for a great number of transmitted pulses. The surface of water in a river, for example, may have a wave motion which varies at a rate on the order of 1 KHz. Hence, the repetition frequency of the transmitted waveform is greater than 1,000 times faster than the wave motion, and at least 1,000 pulses may be reflected from the water surface before the surface has a chance to change appreciably.

The received signal can be expected to be attenuated due to losses incurred during propagation and incurred at the reflective boundary. Typically the return signal strength can vary by a factor of 1,000 to 10,000. The received signal is detected in detector 48 and the detected signal is fed through amplifier 52 to level controller 40 to provide closed loop feedback control of the carrier before modulation. If the return signal level is high, level controller 40 attenuates the carrier supplied to modulator 42; if the return signal level is low, less attenuation (or even amplification) is provided by level controller 40. In effect, the level controller circuit is responsive to the signal strength of the return signal (i.e., the received signal) to ensure that the received signal remains at a constant signal level or amplitude. Because the modulation repetition frequency is several orders of magnitude higher than the target motion, the circuit tends to lock onto the appropriate signal amplitude and maintain that amplitude constant.

It is important to recognize that signal level control is effected before the carrier is modulated. As explained above, present day electronic circuitry tends to introduce phase shift (time delays) which are inherent to the physical limitations of the components used. This includes electronic circuits for boosting or attenuating signal levels. Due to inherent limitations in the electronic components, the phase shift (time delay) of a signal attenuating or amplifying circuit changes as the degree of attentuation or gain is changed. Hence, the placement of a level control circuit or automatic gain control circuit after modulator 42 would add phase error to the system and would not achieve the result obtained by this invention.

The benefit of maintaining a constant return signal amplitude may be seen in FIG. 2. As explained above, even the finest electronic gating circuits require a finite rise time to go from a closed gate state to an open gate state. For purposes of understanding the invention, it will be assumed that the rise time of modulator 42 is 2 ns. from base 26 to peak 28. Comparing return pulses 18 and 20, both pulses will require 2 ns. to reach peak. However, because return pulse 18 is of a higher amplitude than return pulse 20, return pulse 18 crosses threshold 32 more quickly than return pulse 20. By maintaining the return signal amplitude at a constant level, the invention ensures that all return pulses for a given target range will cross threshold 32 at precisely the same time. The error or uncertainty depicted by the different threshold crossing positions X and Y is, thus, eliminated. Preferably, the return signal strength is maintained at a predetermined fixed level above threshold, twice threshold being presently preferred. One benefit which emerges from the use of threshold detected short pulse signals is the elimination of error due to clutter and multipath signals. These extraneous returns from objects other than the target are typically much lower in amplitude than the main return. Hence, they are readily rejected as being below threshold. Pulse 22 illustrates this in FIG. 2.

Once the return signal has been detected, its output appears generally as illustrated on line B of FIG. 4. The detected signal is compared with threshold level 32, and each leading edge threshold crossing generates a spike shown on line C of FIG. 4. These threshold crossings are used to generate a continuous wave (CW) square wave signal in flip flop 56. Flip flop 56 changes state from positive to negative to positive with each threshold crossing. Hence, the output of flip flop 56, shown on line D of FIG. 4, is a CW signal at a frequency of one-half the modulation repitition frequency. Thus in this example, the CW square wave signal produced by flip flop 56 is at a frequency of 3.003 MHz. Because the CW square wave signal is generated from threshold crossings of the received waveform, this signal conveys information relating to the target range.

In order to extract the target range information, the circuit employs a down conversion technique, a form of coherent integration. It will be recalled that the modulation repetition frequency (6.006 MHz.) was characterized as comprising two components, namely, 2 w and 2 dw. These components are generated by frequency synthesizer 58, supplying the 2 w component, and frequency synthesizer 60, supplying the 2 dw component. These components are mixed in multiplier 62 and the sum component is used to supply the modulation signal. Thus, frequency synthesizers 58 and 60 represent stable reference frequencies, which contain no target range information. The 2 w output of synthesizer 58 is divided by 2 in circuit 64 to provide a reference signal at frequency w, in this case 3.0 MHz. The 3.0 MHz. reference signal and the 3.003 MHz. received signal are multiplied in multiplier 68 and the difference component dw is extracted using filter 70. The difference component dw is at a frequency of 0.003 MHz., i.e., 3 kHz. The dw signal produced by filter 70 still contains the phase information of the return signal received at antenna 46. This phase information is indicative of the target range. Stated differently, the phase of the return signal is preserved in the down conversion process.

In order to extract the phase information indicative of range, the dw reference signal supplied by frequency synthesizer 60 and divide by 2 circuit 66 is compared with the down converted dw signal in phase comparator 72. The dw reference signal is derived directly from frequency synthesizer 60 and does not vary as target range varies. In contrast, the dw signal derived from the return signal received at antenna 46 includes a phase shift caused by the time it took the transmitted signal to propagate to and from the target. By comparing or subtracting the reference dw signal from the down converted dw signal, the phase difference between the two is extracted. This phase difference yields the target range according to the formula $phi = 2R/c$, where R is the range to the target and c is the velocity of light. In the down conversion process, the phase information, originally carried by the 6.006 MHz. pulse train, is preserved as the signal is converted to a 3 kHz. frequency. The down conversion process results in considerably greater measurement accuracy, as a one degree phase variation at 3 kHz. is 2,000 times longer than a one degree phase variation at 6 MHz. In other words, this is a coherent integration process in which phase information is integrated over an interval appreciably longer than the period between transmitted bursts.

While the invention has been illustrated in conjunction with a water height problem, it will be recognized that the principles of the invention may be employed in a much wider range of applications. The invention may, for example, be useful in determining the level of oil in a super tanker. In addition, the invention may find utility in the construction and manufacturing industries and other disciplines where accurate measurements are required. As stated above, the invention is useable over a wide range of frequencies throughout the electromagnetic spectrum, including optical frequencies. In selecting the modulation frequency, consideration should be given to the rate at which the noncooperative target can be expected to change its position. Preferably, the modulation repetition rate should be on the order of 1,000 times greater than the target movement rate, although the invention will work at both lower and higher modulation repetition frequencies than this. In selecting the amount of reference signal detuning, i.e., in selecting dw, it will be recognized that the smaller dw is made, the lower the down conversion frequency becomes; and, hence, the longer the coherent integration time becomes. At extremely long integration times, the movement of the noncooperative target may present a problem, and at shorter integration times (larger values of dw) accuracy is degraded. Hence, the selection of the appropriate down conversion frequency depends upon the nature of the problem, the range involved, the accuracy desired, and the anticipated rate of movement of the target.

While the invention has been illustrated and described in its presently preferred embodiment, it will be understood that the invention is capable of modification without departing from the scope of the invention as set forth in the appended claims.

What is claimed as novel is as follows:

1. A method for determining the range to a target comprising;
   reflecting a first burst of continuous wave energy from said target;
   receiving said first burst and generating a second burst of continuous wave energy at an energy level determined by the strength of said first received burst;
   reflecting said second burst from said target;
   receiving said second burst and determining a phase difference between said generated second burst and said second received burst by determining a time at which said second burst crosses a predetermined threshold; and
   determining the range to said target in accordance with said phase difference.

2. The method of claim 1 further comprising causing said amplitude of said second burst to reach a predetermined value.

3. The method of claim 1 wherein said second burst of continuous wave energy is generated by generating a carrier having an amplitude determined in accordance with the strength of said first received burst.

4. The method of claim 1 wherein said second burst of continuous wave energy is generated by first generating a carrier having an amplitude determined by the strength of said first received burst and by then gating said carrier to form a burst of continuous wave energy having a leading edge.

5. The method of claim 1 wherein said energy level of said second burst of continuous wave energy is referenced to said predetermined threshold.

6. The method of claim 1 further comprising adjusting the energy level of said second burst of continuous wave energy so that said second received burst is twice said predetermined threshold.

7. A method for determining the range to a target comprising:
   reflecting a first burst of continuous wave energy from said target;
   receiving said first burst and generating a second burst of continuous wave energy at an energy level determined by the strength of said first received burst;
   reflecting said second burst from said target;
   receiving said second burst and down converting said second received burst;
   using said down converted burst to determine a phase difference between said generated second burst and said second received burst; and
   determining the range to said target in accordance with said phase difference.

8. A method for determining the range to a target comprising:
   reflecting a repeating sequence of discrete electromagnetic bursts from said target;
   receiving said bursts after reflection from said target;
   adjusting the amplitude of said repeating sequence so that said received bursts have a substantially constant amplitude;
   converting said received bursts to a continuous wave signal;
   down converting said continuous wave signal to a second frequency signal having a phase component; and
   determining the range from said phase component.

9. The method of claim 8 further comprising providing a carrier and gating said carrier to provide said repeating sequence of discrete electromagnetic bursts.

10. The method of claim 8 further comprising detecting said received bursts to provide a detected signal and using said detected signal to adjust the amplitude of said repeating sequence.

11. The method of claim 8 with the down converting step further comprising providing a reference signal, mixing said reference signal with said continuous wave signal to produce sum and difference components and extracting said difference component.

12. The method of claim 8 further comprising providing a reference signal having a phase component and comparing the phase component of said reference signal with said phase component of said second frequency signal to determine the range to said target.

13. A method for determining the range to a target comprising:
   providing a carrier and gating said carrier at discrete interval to form electromagnetic bursts;
   reflecting said bursts from said target and receiving the return of said bursts after reflection;
   detecting the return bursts to provide a detected signal;
   using said detected signal to control the amplitude of said carrier;
   comparing said detected signal with a predetermined threshold and generating a threshold crossing signal;
   generating a continuous wave signal in synchronism with said threshold crossing signal;
   mixing said continuous wave signal with a reference signal of known phase and of a frequency detuned relative to said continuous wave signal to provide sum and difference frequencies; and
   extracting said difference frequency and comparing the phase of said difference frequency with a second reference frequency of known phase to determine a phase difference indicative of said range.

14. An apparatus for determining the range to a target comprising:
   a transmitter having means for providing oscillations at a controlled amplitude and having gating means for modulating said oscillations to provide a gated signal;
   means for propagating and reflecting said gated signal to produce a return signal;
   a receiver receptive of said return signal and having means for providing a control signal based on the strength of said return signal;
   means responsive to said control signal for controlling said amplitude of said oscillations;
   threshold detecting means responsive to said return signal for providing a continuous wave signal at a first frequency;

down conversion means receptive of said continuous wave signal for providing a shifted frequency signal at a second frequency; and means for phase comparing the shifted frequency signal with a reference signal to determine the range to said target.

15. The apparatus of claim 14 wherein said transmitter comprises Gunn oscillator means.

16. The apparatus of claim 14 wherein said gating means comprises at least one PIN switching means.

17. The apparatus of claim 14 wherein said receiver means includes detector means for providing a detected signal, said detected signal being used to control said amplitude of said oscillations.

18. The apparatus of claim 14 wherein said control signal responsive means comprises variable attenuator means.

19. The apparatus of claim 18 wherein said variable attenuator means comprises at least one PIN switching means.

20. The apparatus of claim 14 wherein said threshold detecting means comprises means for comparing said return signal to a predetermined threshold to produce a threshold signal and bistable means for generating said continuous wave signal in response to said threshold signal.

21. The apparatus of claim 14 wherein said down conversion means comprises reference signal generating means for providing a reference signal at a predetermined frequency detuned with respect to said continuous wave signal and means for mixing said reference signal and said continuous wave signals.

* * * * *